United States Patent
Gao et al.

(10) Patent No.: US 10,002,374 B2
(45) Date of Patent: Jun. 19, 2018

(54) DYNAMIC GROUP FORMATION FOR ELECTRONICALLY COLLABORATIVE GROUP EVENTS

(71) Applicant: International Business Machines Corporation, Armonk, NY (US)

(72) Inventors: Chun Yang Gao, Beijing (CN); Qi Ning Li, Beijing (CN); Zhen Liu, Beijing (CN); Leho Nigul, Richmond Hill (CA); Hong Peng, Beijing (CN); Yan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 14/200,941

(22) Filed: Mar. 7, 2014

(65) Prior Publication Data

US 2015/0254742 A1    Sep. 10, 2015

(51) Int. Cl.
*G06Q 30/00* (2012.01)
*G06Q 30/06* (2012.01)
*H04L 12/18* (2006.01)
*G06Q 50/00* (2012.01)
*H04L 12/58* (2006.01)

(52) U.S. Cl.
CPC ..... *G06Q 30/0605* (2013.01); *G06Q 30/0619* (2013.01); *G06Q 30/0633* (2013.01); *G06Q 50/01* (2013.01); *H04L 12/1813* (2013.01); *H04L 12/1822* (2013.01); *H04L 51/32* (2013.01)

(58) Field of Classification Search
CPC .......................... G06Q 30/06; G06Q 30/0605

USPC .................. 705/14.16, 14.27, 26.7, 26.2
See application file for complete search history.

(56) References Cited

U.S. PATENT DOCUMENTS

| | | | |
|---|---|---|---|
| 7,970,661 B1 | 6/2011 | Abraham et al. | |
| 8,170,919 B2 | 5/2012 | Barbour et al. | |
| 8,386,486 B2 | 2/2013 | Zhang et al. | |
| 8,739,044 B1 | 5/2014 | Varadarajan | |
| 9,171,315 B1 | 10/2015 | Jayaram | |
| 9,299,099 B1 * | 3/2016 | Jayaram | G06Q 30/0631 |
| 2005/0096997 A1 * | 5/2005 | Jain | G06Q 30/0601 |
| | | | 705/26.1 |

(Continued)

OTHER PUBLICATIONS

Gao et al., "Dynamic Group Formation for Electronically Collaborative Group Events," U.S. Appl. No. 14/557,526, filed Dec. 2, 2014.

(Continued)

*Primary Examiner* — Oluseye Iwarere
(74) *Attorney, Agent, or Firm* — Christopher M. Coy (57) ABSTRACT

Member profiles, for the participants of a social networking service and their relationship information with other participants and activity history data, are received. A plurality of groups is generated that include one or more participants. A set of parameters for a collaborative shopping event is received. At least one group is adjusted based upon the set of parameters. The participants of the at least one group are sent an invitation to join the collaborative shopping event. The collaborated shopping event is linked to a cyber shopping service. The at least one group is scored based upon participation of participants in the collaborative shopping event. The participants in the collaborative shopping event are modified based upon the score.

15 Claims, 7 Drawing Sheets

(56) References Cited

U.S. PATENT DOCUMENTS

| | | | |
|---|---|---|---|
| 2009/0177695 A1* | 7/2009 | Mahajan | G06Q 10/10 |
| 2010/0017307 A1 | 1/2010 | Barbour et al. | |
| 2010/0042511 A1* | 2/2010 | Sundaresan | G06Q 10/10 |
| | | | 705/26.1 |
| 2010/0287023 A1 | 11/2010 | Knobel et al. | |
| 2011/0016023 A1 | 1/2011 | Zakas | |
| 2011/0041083 A1 | 2/2011 | Gabai et al. | |
| 2011/0093361 A1* | 4/2011 | Morales | G06Q 10/087 |
| | | | 705/26.62 |
| 2011/0178889 A1 | 7/2011 | Abraham et al. | |
| 2012/0123837 A1* | 5/2012 | Wiesner | G06Q 30/0214 |
| | | | 705/14.16 |
| 2012/0179516 A1* | 7/2012 | Fakhrai | G06Q 30/08 |
| | | | 705/14.1 |
| 2012/0185355 A1* | 7/2012 | Kilroy | G06Q 30/0633 |
| | | | 705/26.8 |
| 2013/0041781 A1* | 2/2013 | Freydberg | G06Q 50/01 |
| | | | 705/27.1 |
| 2013/0054328 A1* | 2/2013 | Chavie | G06Q 50/01 |
| | | | 705/14.23 |
| 2013/0066750 A1 | 3/2013 | Siddique et al. | |
| 2013/0117378 A1* | 5/2013 | Kotorov | G06Q 50/01 |
| | | | 709/205 |
| 2013/0132157 A1 | 5/2013 | Gross | |
| 2013/0179258 A1 | 7/2013 | Moskos et al. | |
| 2013/0218703 A1* | 8/2013 | Jakobson | G06Q 30/06 |
| | | | 705/26.2 |
| 2013/0268331 A1* | 10/2013 | Bitz | G06Q 30/0631 |
| | | | 705/14.16 |
| 2013/0325605 A1* | 12/2013 | Callaghan | G06Q 30/02 |
| | | | 705/14.53 |
| 2013/0339452 A1* | 12/2013 | Shaikh | H04L 51/32 |
| | | | 709/205 |
| 2014/0222619 A1 | 8/2014 | Kamalsky | |
| 2014/0279496 A1* | 9/2014 | Rauh | G06Q 30/02 |
| | | | 705/44 |
| 2014/0344093 A1* | 11/2014 | Du | G06Q 30/06 |
| | | | 705/26.2 |
| 2014/0365313 A1 | 12/2014 | Reese et al. | |
| 2015/0058154 A1* | 2/2015 | Appleyard | G06Q 30/0611 |
| | | | 705/26.4 |

OTHER PUBLICATIONS

Cuevas, M., "Collaborative Online Shopping: The Next Wave in E-Commerce", E-Commerce Times, Expert Advice, May 28, 2013, Copyright 1998-2014 ECT News Network, Inc. http://www.ecommercetimes.com/story/78142.html.

IBM, "Method and Process for Leveraging Social Networks in Collaborative Interfaces", IP.com Prior Art Database Technical Disclosure, IP.com No. IPCOM000152424D, May 3, 2007. http://ip.com/IPCOM/000152424.

Li et al., "A social recommender mechanism for e-commerce: Combining similarity, trust, and relationship", Decision Support Systems, vol. 55, Issue 3, Jun. 2013, pp. 740-752, Copyright © Elsevier B.V. http://www.sciencedirect.com/science/article/pii/S0167923613000705.

Mell et al., "The NIST Definition of Cloud Computing", National Institute of Standards and Technology, NIST Special Publication 800-145, Sep. 2011, Gaitersburg, MD.

* cited by examiner

DYNAMIC GROUP FORMATION FOR ELECTRONICALLY COLLABORATIVE GROUP EVENTS

BACKGROUND

The present disclosure relates to electronically collaborative experiences, and more specifically, to the formation of dynamic groups for an electronically collaborative group events, such as events relating to a shopping experience.

Social networking services have become very important for individuals to create, share, and exchange information and ideas with one another. Social networking services may take several forms, such as internet forums, weblogs, social blogs, social networks, etc. Furthermore, information that may be exchanged may take several forms, such as blogs, pictures, video blogs, wall-posts, etc. A group may be created using social networking services which allow users to create, post, comment to and read from their own interest- and niche-specific forums. Groups, which may allow for open or closed access, invitation and/or joining by other users, may be formed to provide mini-networks within the larger, more diverse social network service.

SUMMARY

Embodiments of a method for enablement of collaborative shopping for participants of a social networking service. In various embodiments, the method may include receiving member profiles for the participants of the social networking service, the member profiles including relationship information between the participants and participant activity history data. The method may also include generating, based upon the relationship information and the participant activity history data, a plurality of groups that include one or more of the participants. Also, the method may include receiving a set of parameters for a collaborative shopping event. In addition, the method may include adjusting at least one group from the plurality of groups based upon the set of parameters. The method may also include sending, to participants in the at least one group, an invitation to join the collaborative shopping event. Consistent with various embodiments, the method may also include linking the collaborative shopping event to a cyber shopping service. Also, the method may include scoring the at least one group based upon participation of participants in the collaborative shopping event. Furthermore, the method may include modifying the participants in the collaborative shopping event based upon the score.

Embodiments of a system for enablement of collaborative shopping for participants of a social networking service. In various embodiments, the system may include a data-mining module configured to receive member profiles for the participants of the social networking service, the member profiles including relationship information between the participants and participant activity history data. The data-mining module may also be configured to generate, based upon the relationship information and the participant activity history data, a plurality of groups that include one or more of the participants. Also, the data-mining module may be configured to receive a set of parameters for a collaborative shopping event, adjust at least one group from the plurality of groups based upon the set of parameters, and send, to participants in the at least one group, an invitation to join the collaborative shopping event. The system may also include a collaboration enablement module configured to link the collaborative shopping event to a cyber shopping service. Furthermore, the system may also include a scoring tool configured to score the at least one group based upon participation of participants in the collaborative shopping event, and modify the participants in the collaborative shopping event based upon the score.

Embodiments of a computer program product configured to enable collaborative shopping for participants of a social networking service. In various embodiments, the computer program product may receive member profiles for the participants of the social networking service, the member profiles including relationship information between the participants and participant activity history data. The computer program product may also generate, based upon the relationship information and the participant activity history data, a plurality of groups that include one or more of the participants. Also, the computer program product may receive a set of parameters for a collaborative shopping event. Consistent with various embodiments, the computer program product may adjust at least one group from the plurality of groups based upon the set of parameters. In addition, the computer program product may send, to participants in the at least one group, an invitation to join the collaborative shopping event. The computer program product may also link the collaborative shopping event to a cyber shopping service. Also, the computer program product may score the at least one group based upon participation of participants in the collaborative shopping event. Furthermore, the computer program product may modify the participants in the collaborative shopping event based upon the score.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronically collaborative experiences, more particular aspects relate to the formation of dynamic groups for electronically collaborative group events, which can be related to a shopping experience. While the present disclosure is not necessarily limited to such applications, various aspects of the disclosure may be appreciated through a discussion of various examples using this context.

Embodiments of the present disclosure may be employed to form groups that are persistent (e.g., family, friends), interest specific (e.g., likes similar books, clothing, television programs, etc.), goal specific (e.g., share shipping cost, purchase a product in bulk to obtain a discount, etc.), etc. When a group is created, individuals may receive an invitation to join a collaborative shopping event. Each individual may accept or decline the invitation and once an individual has accepted the invitation, they may send and/or receive messages and/or photo messages to and from the other individuals who accepted the invitation. Thus allowing members of the group to collaborate and communicate with one another for the purpose of utilizing a cyber shopping service for a group shopping experience.

As used herein, the term social networking service refers to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like. An online social networking service typically comprises an individual's set of direct and/or indirect personal relationships, including real and virtual privileges and permissions that individuals may associate with these people. Direct personal relationships usually include relationships with people the individual may have communicated with directly, including family members, friends, colleagues, coworkers, and other people with whom the individual has had some form of direct contact, such as contact in person, by telephone, by email, by instant message, by letter, or the like.

As used herein, the term participant refers to an individual that has a member profile on a social networking service. A social networking service may include various profile information about a participant, including, but not limited to the participant's image or avatar, contact information, the participant's preferences, degrees of separation between the participant and another participant, a membership in an activity, group, or the like. Social networking service information further may include various information about communications between the participant and other participants in the social networking service, including, but not limited to emails, social networking services (SNS) messages, instant messaging (IM) messages, Multimedia Message (MMS) messages, alerts, audio messages, phone calls, either received or sent by the participant, or the like.

Embodiments of the present invention will now be described more fully hereinafter with reference to the accompanying figures. However, this invention may be embodied in many different forms and should not be construed as limited to the embodiments set forth. The embodiments disclosed are provided so that this disclosure may fully convey the scope of the invention to those skilled in the art. Therefore, the following detailed description is not to be taken in a limiting sense.

Figure 1:
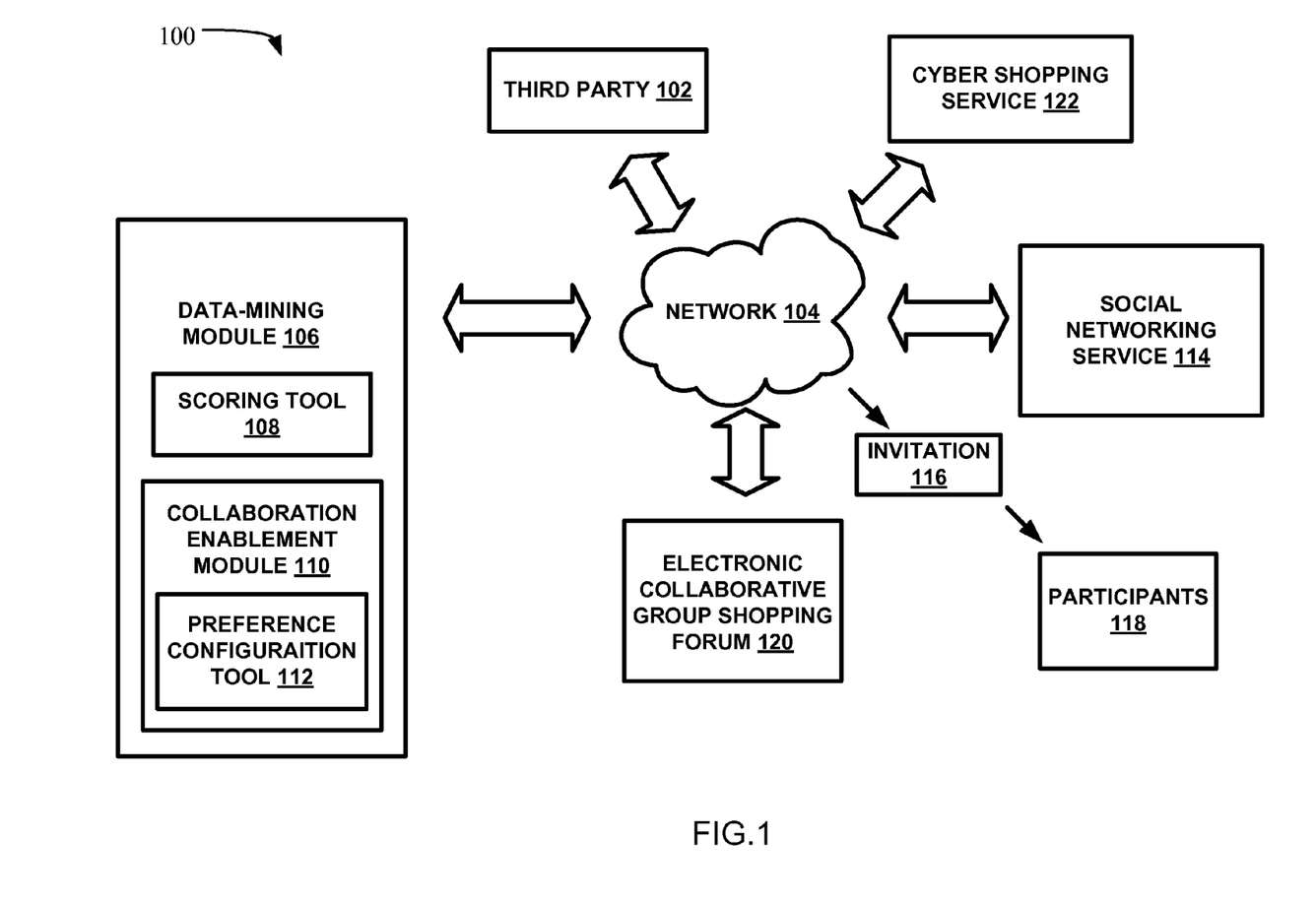
FIG. 1 illustrates a computing infrastructure configured to execute dynamic group formation for an electronically collaborative group shopping experience, consistent with embodiments of the present disclosure.

FIG. 1 illustrates a computing infrastructure 100 configured to execute dynamic group formation for an electronically collaborative group shopping experience, consistent with embodiments of the present disclosure. The infrastructure may include a third party 102, a data-mining module 106, a social networking service 114, an invitation 116, a participant 118, and electronic forum 120, and a cyber shopping service 122, which are communicatively coupled to each other using one or more communication networks 104. The network 104 may include the wide area networks (such as the Internet), local area networks that can include one or more servers, networks, or databases, and may use a particular communication protocol to transfer data between the entities included in computing infrastructure 100.

The third party 102 is included to represent an entity that can generate a request that the data-mining module 106 create a dynamic group. FIG. 1 represents third party 102 as a separate entity and communicating to the data-mining module 106 via network 104. However, this is only for illustrative purposes and third party 102 may be included within data-mining module 106, social networking service 114, electronic forum 120, etc. Also, third party 102 may be a number of entities that requests the creation of a dynamic group, such as an individual, an enterprise, computer software, etc.

The data-mining module 106 may use a set of criteria to discover groups of participants on the social networking service 114 via network 104. The set of criteria may instruct the data-mining module 106 to obtain certain information on the member profile of a participant on the social networking service 114. The set of criteria may instruct the data-mining module 106 to obtain a number of different types of information on the member profile of a participant, such as relationships of a participant, participant behavior histories, participant registration information, classifications and similarities between products that participants have purchased, data from marketing activities, etc.

Once the groups are discovered, the data-mining module 106 may receive a set of parameters. The parameters may indicate, to the data-mining module 106, which participants from the groups may be selected to take part in an electronically collaborative group shopping experience. For instance, the set of parameters may be based on the relationships of the participants, where the participants work, shared goals of participants, etc. Furthermore, there may be one parameter or several parameters. For example, a parameter may instruct the data-mining module 106 to send an invitation 116 to participants 118 that have a first order relationship or a second order relationship with the third party 102. The third party 102 has a first order relationship with the participants 118 that they are "friends" with on the social networking service 114. In this example, a "friend" can be defined as another participant 118 that is member of the third party's network and the third party 102 may view the participant's full member profile. A second order relationship could be defined as a participant 118 that is not a "friend" of the user, but has at least ten mutual "friends" with the third party 102. These, and other, different orders (or levels) of relationships can be used alone or in various combinations. The data-mining module 106 may then select the participants 118 that are "friends" with the third party 102 or has ten mutual "friends" with the third party 102 and send them an invitation 116 to join an electronically collaborative group shopping experience.

In the preceding example, the parameter was set for first order and second order relationships. However, this example is only for descriptive purposes and other parameters may be set that instruct the data-mining module 106 to send an invitation 116 to different participants 118. For instance, a parameter may instruct the data-mining module 106 to send an invitation 116 to any participant 118 that is employed at the same enterprise as third party 102 or to any participant 118 that lives in the same town or city as the third party 102. Also, if orders of relationships are used, the parameters may be relaxed to allow third order relationships, fourth order relationships, etc. into the group. Furthermore, FIG. 1 represents participants 118 as a separate entity and communicating to the data-mining module 106 via network 104. However, this is only for illustrative purposes and participants 118 may be included within social networking service 114, third party 102, cyber shopping service 122, etc.

When the groups have been formed and the invitations 116 sent to the participants 118, the participants 118 may accept or decline the invitation. The participants 118 who accept the invitation 116 may be linked to the electronic collaborative group shopping forum 120. FIG. 1 represents the electronic collaborative group shopping forum 120 as a separate entity and communicating to the data-mining module 106 via network 104. However, this is only for illustrative purposes and the group shopping forum 120 may be included within, or through, social networking service 114, third party 102, the data-mining module 106, etc.

A few examples of collaborations that may be enabled using the group shopping forum 120 may include discussions or various kinds of input from participants 118 involved about recommendations of products. To enable this discussion capability, the recommendations are given to the participants 118 using a collaboration enablement module 110, shown included within the data-mining module 106. The recommendations may be given such that each participant 118 is informed that there are other participants 118 receiving these recommendations. The collaboration enablement module 110 may then provide a method or methods for the participants 118 to give input to the recommendations. For example, a recommendation may be given to the participants 118 on the social networking service 114 and when any of them give feedback on the recommendation, other participants 118 involved may see the feedback. In another example, the participants 118 may also be involved in emails so that they may reply to the emails to discuss. Furthermore, there may be a feature available with the recommendation such that each participant 118 may open a "chat-box" for the recommendation and the other participants 118 are automatically involved in the "chat."

In addition to the collaborative aspects of the electronic collaborative group shopping forum 120, participants 118 who have accepted the invitation 116 may also invite other individuals to join the group. Also, when product recommendations have been made and a participant 118 has questions about a product, the group shopping forum 120 may have the capability to recommend other participants 118, to the participant 118, who may be able to answer a participant's questions. The group shopping forum 120 may also be capable of suggesting participants 118 to the participant 118 that have interest in the product and may be consulted by the participant 118 in a one on one discussion or in a group discussion.

The collaboration enablement module 110 may also provide a feature such that the electronic collaborative group shopping forum 120 may be linked to the cyber shopping service 122. The participants 118 may then be capable of opening a shared shopping cart created for them by the collaboration enablement module 110. The participants 118 may choose to shop on the cyber shopping service 122 individually or in the shared shopping cart. The participants 118 may add items to the shared shopping cart, choose to have the items delivered to one location or multiple locations, and confirm the purchasing of the items and the delivery methods of the items. The collaboration enablement module 110 may then calculate the price of the items in the shared shopping cart and delivery costs including any promotions from the cyber shopping service 122. The collaboration enablement module 110 may then allow the participants 118 to choose to pay for their items or designate payment to another participant 118.

In the collaborations, some participants 118 may not want to disclose certain information to other participants 118 that also accepted the invitation 116 to join the electronically collaborative group shopping experience. For example, if participant 1 receives a product recommendation and the recommendation says that participant 2 and participant 3 are also receiving the recommendation, then participant 1 may infer that participant 2 and participant 3 have also viewed this product or similar products. However, participant 2 and participant 3 may not want this information to be known by other participants. The collaboration enablement module 110 may then include a preference configuration tool 112 that may enable participant 2 and participant 3 to configure their own level of privacy protection.

The preference configuration tool 112 may also allow participants 118 to disable the feature of receiving invitations 116 to join an electronically collaborative group shopping experience. A participant 118 may also configure the information, from the member profile of the participant 118, that the data-mining module 106 is allowed to use to discover groups. For example, the participant 118 may disallow the data-mining module 106 to use the participant's browsing history, shopping history, or voting data for group discovery so that other participants that accept an invitation 116 not know such histories of the participant 118. Furthermore, the third party 102 that creates the group, may use the preference configuration tool 112 to configure settings so that when participants 118 receive an invitation 116 or receive product recommendations, the participants may not know who sent the invitation 116 or recommendations, but the participants may still be ensured that the third party 102 is someone they have a relationship with and not a solicitation from an unwanted source. In addition, if a participant 118, who has their identity withheld from other participants 118, would like to designate another participant 118 to pay for items in a group shopping cart or have the items delivered to the other participant 118, the participant 118 must agree to disclose his or her identity to the participant 118 who will pay for or receive the items.

Consistent with various embodiments, the data-mining module 106 may also receive post-recommendation behavior data and adjust the electronically collaborative group shopping experience. The post-recommendation behavior data may include preference settings from the preference configuration tool 112 and group activity of the participants 118, such as a participant's degree of participation in the collaboration, the participant's comments or ratings of the products recommended, whether a participant chooses to leave the group, whether a participant buys a product recommended, etc. The data-mining module 106 may include a scoring tool 108 that scores the group and/or the participants of the group, based on the post-recommendation data. Then, through time, a group and/or the participants of the group that have low scores may be eliminated and a group and/or the participants of the group that have high scores may persist and be used to calculate future recommendations.

Figure 2:
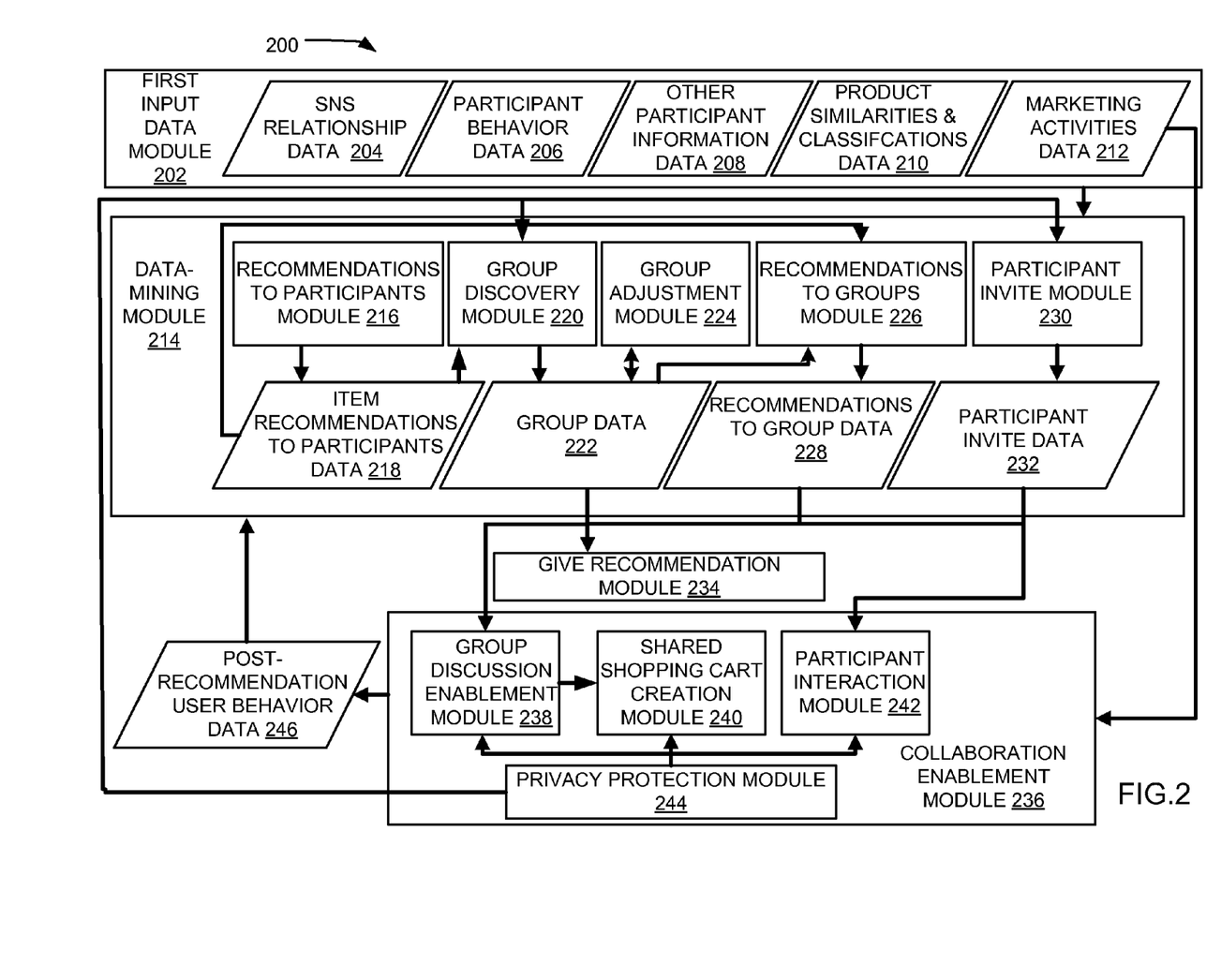
FIG. 2 illustrates a sequence diagram for dynamic group formation of an electronically collaborative group shopping experience, consistent with embodiments of the present disclosure.

FIG. 2 illustrates a sequence diagram 200 for dynamic group formation of an electronically collaborative group shopping experience, consistent with embodiments of the present disclosure. Initially, first input data module 202 may include first input data. As shown, the first input data may include social networking service participant relationships 204, participant behavior data 206, other participant information 208, classifications and similarities between products that participants have purchased 210, and data from marketing activities 212.

In various embodiments, the first input data module 202 may pass first input data to a data-mining module 214. As illustrated, the data-mining module 214 may include a recommendations to participants module 216. The recommendations to participants module 216 may use the first input data to determine item recommendations to each participant for whom first input data has been collected. The module may then create item recommendations to participants data 218 and pass it to a recommendations to groups module 226 and to a group discovery module 220. The group discovery module 220 may discover groups based on the first input data in conjunction with the item recommendations to participants data 218. In an example, the item recommendations to participants data 218 may be a set of parameters that the group discovery module 220 may use to form a number of different groups. The parameters may be based on relationship data, product purchase data, communication or comment data, etc. The group discovery module 220 may then use the parameters and the first input data to assort participants into different groups. From this assortment, group data 222 may then be created and passed to a group adjustment module 224.

The group adjustment module 224 may take the group data 222 and adjust the discovered groups accordingly. For example, an invitation 116, from FIG. 1, may have been sent to the participants 118, from FIG. 1. The participants 118 may then accept or decline the invitation 116. The discovered groups may then be adjusted so the groups now only include participants 118 that accepted their invitation 116. From this adjustment, new group data 222 may be created and passed to the recommendations to groups module 226 and a group discussion enablement module 238.

The recommendations to groups module 226 may use the group data 222 in conjunction with the item recommendations to participants data 218 to make recommendations to the groups. For example, the groups may have been discovered using parameters based on product purchase data. The parameters may have delineated participants into groups that have purchased similar products. The recommendations to groups module 226 may then use the product purchase data to determine recommendations to the groups about even more similar products. In another example, the parameters may be based on relationship data. The parameters may have delineated the groups into participants that work for the same enterprise. The recommendations to groups module 226 may then us the relationship data to determine recommendations about products that may be useful in their employment. From these determinations, recommendations to groups data 228 may be created and passed to a give recommendations module 234 and the group discussion enablement module 238.

As shown, a participant invite module 230 may also be included within the data-mining module 214. A participant who is a member of a group may know of other individuals who may be interested in the recommendations determined by the recommendations to groups module 226. The participant invite module 230 allows a participant to decide whether to invite other individuals to the group so they may also be participants in the group. From this decision, participant invite data 232 may be created and passed to the give recommendations module 234 and a participant interaction module 242. The give recommendations module 234 then makes recommendations to the groups based upon the recommendations to groups data 228 and the participant invite data 232.

Consistent with various embodiments, a collaboration enablement module 236 may be present. As illustrated, included within the collaboration enablement module 236 may be the group discussion enablement module 238, a shared shopping cart creation module 240, the participant interaction module 242, and a privacy protection module 244. Furthermore, the collaboration enablement module 236 may receive marketing activities data 212 that is used by the modules included in the collaboration enablement module 236.

When the give recommendations module 234 has given recommendations and the group data 222, recommendations to groups data 228, and the participant invite data 232 has been received, the group discussion enablement module 238 may enable group discussions about the recommendations by way of emails, a social networking service, chat-box, etc. The group discussion enablement module 238 may then enable the shared shopping cart creation module 240 to create a shared shopping cart for the participants. Furthermore, the shared shopping cart creation module 240 may enable the participants to choose to have items included in the shopping cart delivered to one location or multiple locations, and confirm the purchasing of the items and the delivery methods of the items. The shared shopping cart creation module 240 may then calculate the price of the items in the shared shopping cart and delivery costs including any item promotions. The shared shopping cart creation module 240 may then allow the participants to choose to pay for their items or designate payment to another participant.

In various embodiments, the participant interaction module 242 may receive the participant invite data 232 and send an invitation to individuals that a participant would like to include in the group. If the individual accepts the invitation, the participant interaction module 242 may enable the group discussion enablement module 238 to include the new invitee may join in the discussions with the group.

The privacy protection module 244 may allow participants to configure their own level of privacy protection. The privacy protection module 244 may enable the group discovery module 220 to protect certain information from being used to discover groups. Also, the privacy protection module 244 may enable the group discussion enablement module 238 to withhold the identity (or other data) of a participant from other participants in the group during a discussion. In addition, the privacy protection module 244 may enable the shared shopping cart creation module 240 to withhold the identity of a participant from other participants in the group during the group shopping experience. However, if a participant, who has their identity withheld from other participants, would like to designate another participant to pay for items in a shared shopping cart or have the items delivered to the other participant, the participant may need to agree to disclose his or her identity to the participant who will pay for or receive the items. Furthermore, the privacy protection module 244 may enable the participant invite module 230 to protect certain information from being used to decide if an individual should be invited to a group and may enable the participant interaction module 242 to be capable of allowing a participant to send an invitation without the invitee knowing who sent the invitation. However, the invitee may still be ensured that the sender of the invitation is someone they have a relationship with and not a solicitation from an unwanted source. In addition, the participant interaction module 242 may allow participants to disable the feature of receiving invitations to join a group shopping experience.

As shown, post-recommendation data 246 may be created from the execution of the modules within the collaboration enablement module 236. The post-recommendation data 246 may then be passed back to the data-mining module 214. The post-recommendation data 246 may be used by the modules shown in the data-mining module 214 to create more groups or further refine existing groups and recommendations. For example, the post-recommendation data 246 may be used to score a group and/or the participants of the group. A group and/or the participants of the group, that have low scores, may be eliminated and a group and/or the participants of the group, that have high scores, may persist and be used to calculate future recommendations. Furthermore, the post-recommendation data 246 may be used by the recommendations to participants module 216 to create new recommendations to participants data 218 that may then be used in the discovery of new groups.

Figure 3:
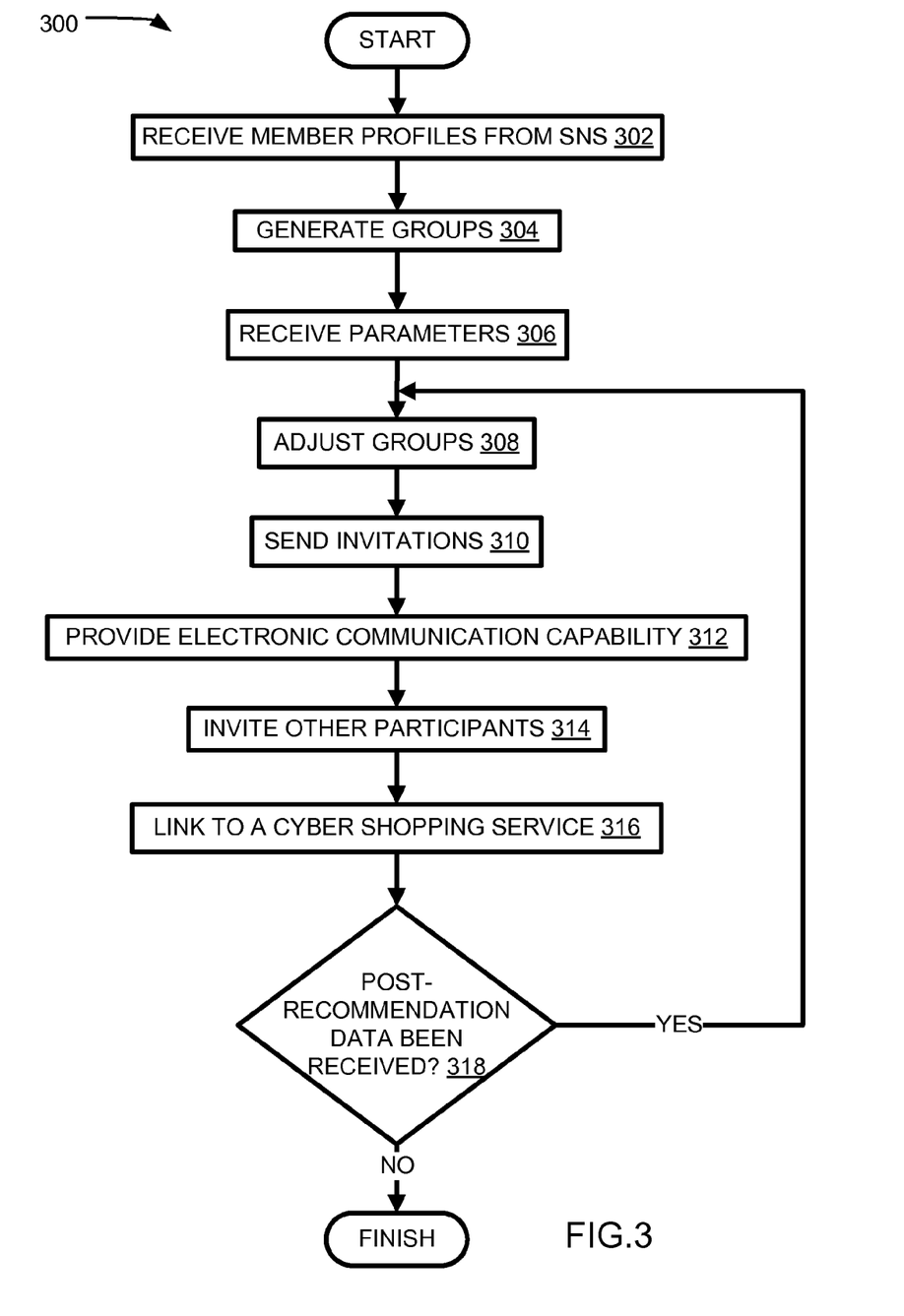
FIG. 3 illustrates a method for dynamic group formation for an electronically collaborative group shopping experience, consistent with embodiments of the present disclosure.

FIG. 3 illustrates a method 300 for dynamic group formation for an electronically collaborative group shopping experience, consistent with embodiments of the present disclosure. At operation 302, member profiles may be received for participants of a social networking service. The member profiles may contain information such as relationships of a participant, participant behavior histories, participant registration information, classifications and similarities between products that participants have purchased, data from marketing activities, etc. The information received may be based on a request for the specific information or a general query for some or all of the information available on the member profiles of participants. At operation 304, groups may be generated based on the information obtained from the member profiles.

Consistent with various embodiments, at operation 306, a set of parameters may be received for the purpose of creating an electronically collaborative group shopping event. The set of parameters may be based on the relationships of the participants, where the participants work, shared goals of participants, etc. Furthermore, there may be one parameter or several parameters. At operation 308, the participants may be selected to take part in the group shopping event based on the parameters. At operation 310, invitations may be sent out to the participants selected. Participants may be capable of accepting or declining the invitation. The participants who accept the invitation may then be provided with an electronic communication capability, per operation 312. With this capability, participants may be able to take part in various discussions about recommendations of products made to the group. The participants may provide input or feedback about recommendations, suggest products that may be of interest to other participants, etc. Furthermore, the communication capability may be provided using a social networking service, e-mail, "chat-box", etc. In addition to being able to communicate electronically with other participants in the group, participants may send invitations to other individuals to join the group, per operation 314. The invitees may accept or decline the invitations and if they accept, they may also be capable of communicating electronically with other participants in the group.

In various embodiments, at operation 316, the collaborative shopping group may be linked to a cyber shopping service. The participants may then be capable of opening a shared shopping cart created for them. The participants may choose to shop on the cyber shopping service individually or in the shared shopping cart. The participants may add items to the shared shopping cart, choose to have the items delivered to one location or multiple locations, and confirm the purchasing of the items and the delivery methods of the items. The price of the items in the shared shopping cart may then be calculated along with the delivery costs including any promotions from the cyber shopping service. The participants may then be allowed to choose to pay for their items or designate payment to another participant.

As shown, operation 318 determines whether any post-recommendation behavior data may be received. If post-recommendation behavior data is received, the groups may then be adjusted in operation 308. The post-recommendation behavior data may be based on preferences configured by the participants. A participant may configure their preference in such a way that they may not want to disclose certain information to other participants that also accepted the invitation to join the electronically collaborative group shopping experience. For instance, a participant may wish to have their identity withheld from other participants during a group collaboration event. Preferences may also be configured to disable the feature of receiving invitations to join an electronically collaborative group shopping experience, select the information that is allowed to be used to discover groups, withhold a participant's identity when the participant invites other individuals to join the group, withhold participants identities during group shopping, etc.

In addition, the post-recommendation behavior data may be based on a participant's degree of participation in the collaboration, the participant's comments or ratings of the products recommended, whether a participant chooses to leave the group, whether a participant buys a product recommended, etc. A group and/or the participants of the group may then be scored based on the post-recommendation behavior data. The group and/or the participants of the group that have low scores may then be eliminated and a group and/or the participants of the group that have high scores may persist and be used to calculate future recommendations.

Figure 4:
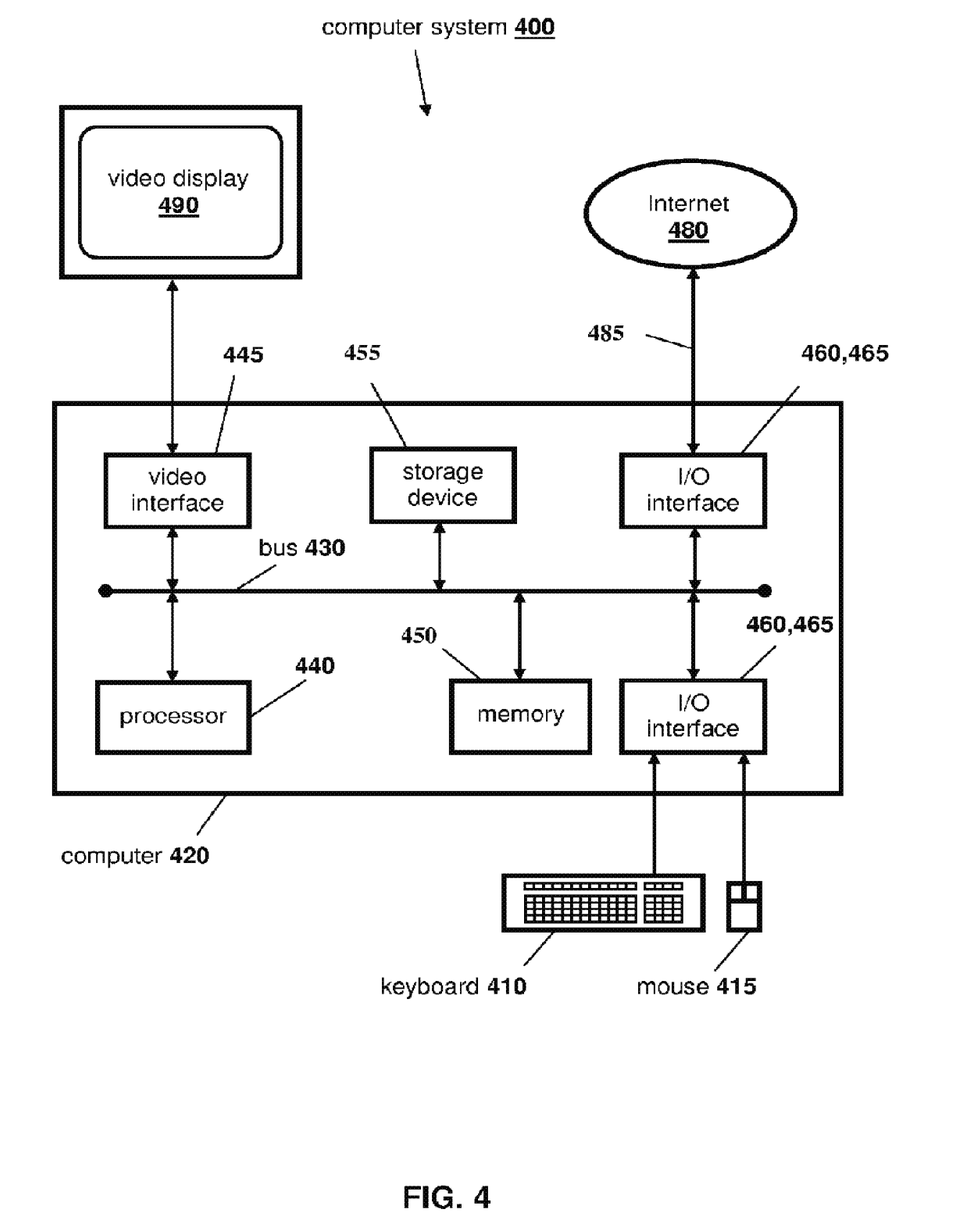
FIG. 4 illustrates an embodiment of a computer system that is suitable for executing the computer software for a dynamic group formation for an electronically collaborative group shopping experience as described with respect to the figures herein.

FIG. 4 depicts a schematic representation of a computer system 400 of a type that is suitable for executing computer software for a dynamic group formation for an electronically collaborative group shopping experience, consistent with embodiments of the present disclosure. Computer software executes under a suitable operating system installed on the computer system 400, and may be thought of as comprising various software code for achieving particular steps.

The components of the computer system 400 include a computer 420, a keyboard 410, a mouse 415, and a video display 490. The computer 420 includes a processor 440, a memory 450, input/output (I/O) interfaces 460, 465, a video interface 445, and a storage device 455.

The processor 440 is a central processing unit (CPU) that executes the operating system and the computer software executing under the operating system. The memory 450 includes random access memory (RAM) and read-only memory (ROM), and is used under direction of the processor 440.

The video interface 445 is connected to video display 490 and provides video signals for display on the video display 490. User input to operate the computer 420 is provided from the keyboard 410 and mouse 415. The storage device 455 can include a disk drive or other suitable storage mediums.

Each of the components of the computer 420 is connected to an internal bus 430 that includes data, address, and control buses, to allow components of the computer 420 to communicate with each other via the bus 430.

The computer system 400 can be connected to one or more other similar computers via an input/output (I/O) interface 465 using a communication channel 485 to a network, represented as the Internet 480.

The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420.

FIG. 4 illustrates an embodiment of a computer system 400 that is suitable for executing the computer software for a dynamic group formation for an electronically collaborative group shopping experience as described with respect to the figures herein. It should be appreciated, however, that FIG. 4 provides only an illustration of one implementation and does not imply any limitations with regard to the environments in which different embodiments may be implemented. Many modifications to the depicted environment may be made based on design and implementation requirements. Examples of computer systems, environments, and/or configurations that may be represented by FIG. 4 include, but are not limited to, desktop computers, laptop computers, server computers, thin clients, thick clients, multiprocessor systems, microprocessor-based systems, and distributed cloud computing environments that include the above systems or devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
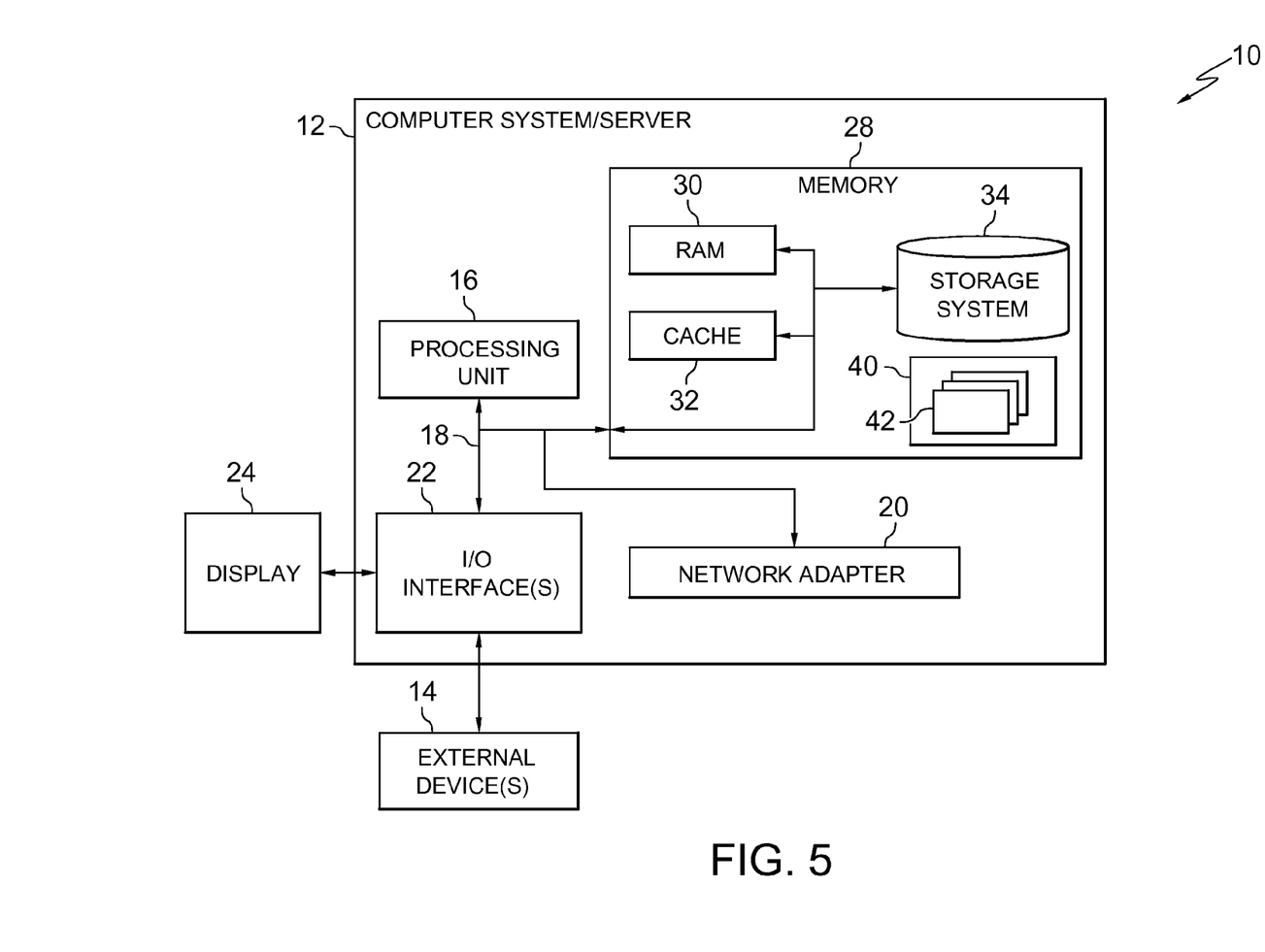
FIG. 5 illustrates a schematic of an example of a cloud computing node.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein above.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
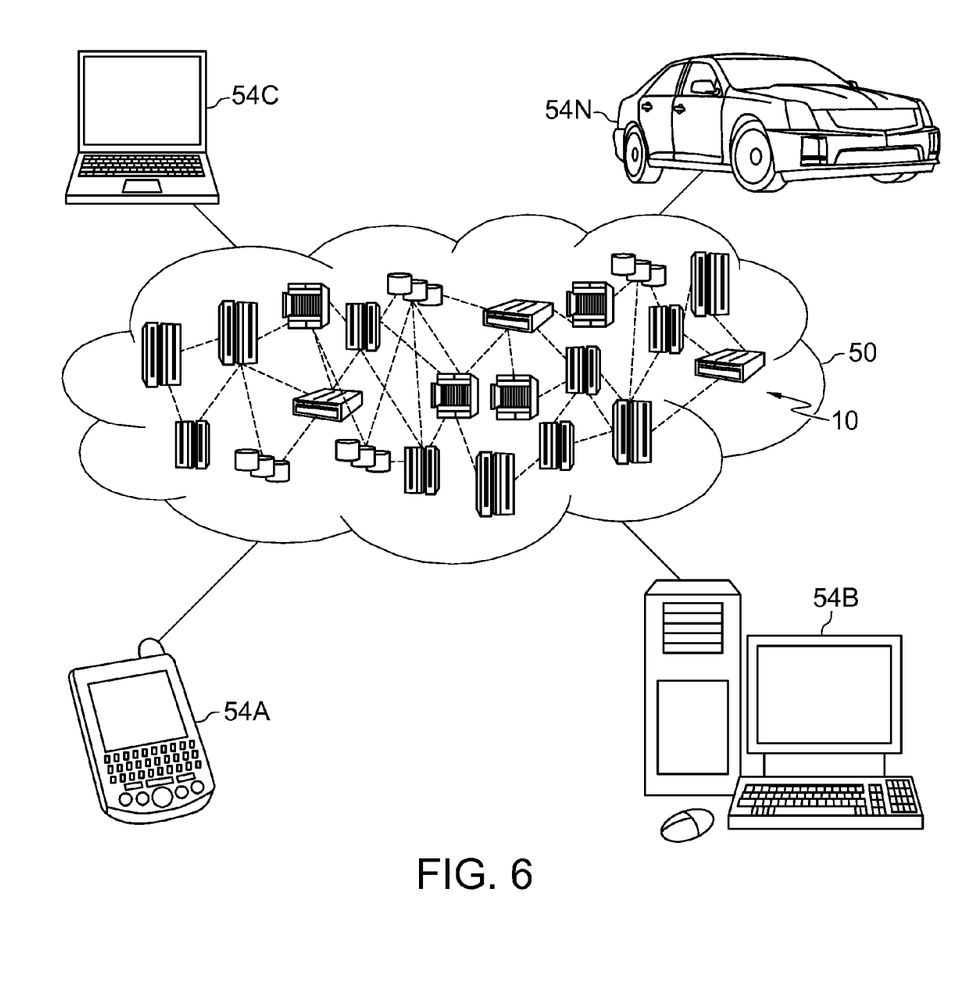
FIG. 6 illustrates a schematic of an example cloud computing environment.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
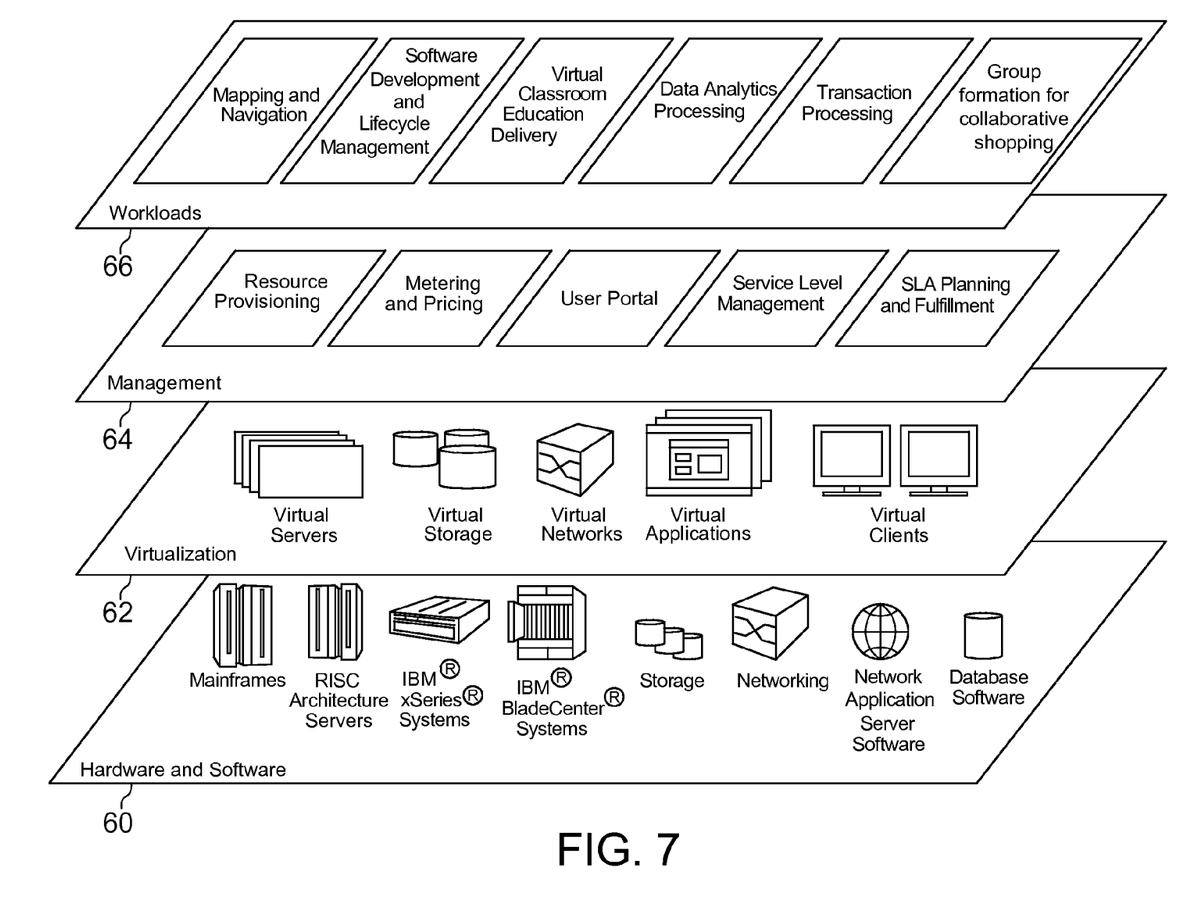
FIG. 7 illustrates a schematic of an example set of functional abstraction layers provided by a cloud computing environment.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided: Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dynamic group formation for an electronically collaborative group shopping experience.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for enablement of collaborative shopping for participants of an online social networking service, the system including a network of interconnected computing nodes, at least one of the interconnected computing nodes including a virtualization layer, a management layer, and a workload layer, the system further includes:
   a data-mining module compute node configured to:
      receive, from a plurality of local compute nodes, member profiles for the participants of the social networking service, the member profiles including relationship information between the participants and participant activity history data,
      receive, from a third party compute node, a request to generate, a plurality of groups that include one or more of the participants,
      generate, at the workload layer of the data-mining module compute node and based on the relationship information and the participant activity history data, the plurality of groups,
      receive a set of parameters for a collaborative shopping event,
      adjust, by a group adjustment module of the data-mining module, at least one group from the plurality of groups based upon the set of parameters, and
      send, to participants in the at least one group, an invitation to join the collaborative shopping event;
   a collaboration enablement module compute node configured to link the collaborative shopping event to a cyber shopping service; and
   a scoring tool included in the data-mining module configured to:
      analyze participation of the participants in the collaborative shopping event,
      score the at least one group based upon the participation of participants in the collaborative shopping event, wherein the scoring the at least one group includes scoring participants of the at least one group and the participation of participants includes using comments and ratings given by a participant to create a score, and
      modify the participants in the collaborative shopping event based upon the score.

2. The system of claim 1, wherein the participant activity history data includes relationships of a participant, behavior history of the participant, and interests of the participant.

3. The system of claim 1, the system further comprising a preference configuration tool configured to receive post-recommendation data describing the participation of the participants in the collaborative shopping event and the collaboration enablement module compute node further configured to:
   provide an electronic communication capability for collaboration between the participants in the collaborative shopping event; and
   provide the participants in the collaborative event the capability to invite other participants to the collaborative shopping event.

4. The system of claim 1, the collaboration enablement module compute node further configured to:
   create, at the management layer of the collaboration enablement module compute node, an electronic group shopping cart that is accessible to the participants in the collaborative shopping event;
   enable the participants in the collaborative event to choose delivering preferences of items included in the electronic group shopping cart;
   calculate cost based on the items included in the electronic group shopping cart and the delivering preferences; and enable participants to choose purchasing preferences for the items included in the electronic group shopping cart.

5. The system of claim 4, wherein the delivering preferences includes at least one location for delivery of the items included in the electronic group shopping cart and the purchasing preferences includes at least one participant from the participants in the collaborative event to pay for the items included in the electronic group shopping cart.

6. The system of claim 3, wherein the electronic communication capability includes electronic mail and the social networking service.

7. A computer program product of a multiprocessor server computer configured to improve electronic collaborative shopping within an online social networking service environment, the computer program product comprising a computer readable storage medium having program code embodied therewith, the program code comprising computer readable program code configured to:
receive, by a data-mining module, member profiles for the participants of the social networking service, the member profiles including relationship information between the participants and participant activity history data, the participant activity history data including behavior history of the participants, wherein the behavior history of the participants includes a degree of participation of the participants within one or more existing collaborations;
creating and assorting, by the data-mining module and based upon the relationship information and the participant activity history data, a plurality of groups that include one or more of the participants, wherein the plurality of groups do not exist prior to the creating and assorting;
receive, by the data-mining module, a set of parameters for a collaborative shopping event;
adjust, by the data-mining module, at least one group from the plurality of groups based upon the set of parameters;
send, to participants in the at least one group, an invitation to join the collaborative shopping event;
link, by the data-mining module, the collaborative shopping event to a cyber shopping service;
score, by the data-mining module, the at least one group based upon participation of participants in the collaborative shopping event, wherein when the at least one group scores a score below a first threshold value the at least one group is eliminated as a group and when the at least one group scores a score above a second threshold value, the at least one group persists and is used to calculate future recommendations; and
modify, by the data-mining module, the participants in the collaborative shopping event based upon the score.

8. The computer program product of claim 7, wherein the participant activity history data includes relationships of a participant, and interests of the participant, the interests of the participant including one or more product interests of the participant.

9. The computer program product of claim 7, wherein the computer program is configured to score the at least one group by scoring participants of the at least one group and the participation of participants includes using comments, and ratings given by a participant to create a score, the ratings corresponding to the participant giving a numerical value to rate the at least one group, the numerical value including the score.

10. The computer program product of claim 7, further configured to:

provide an electronic communication capability for collaboration between the participants in the collaborative shopping event;
provide the participants in the collaborative event the capability to invite other participants to the collaborative shopping event; and
receive post-recommendation data describing the participation of the participants in the collaborative shopping event, the post-recommendation data including information indicating whether one or more new groups should be created and whether to refine the plurality of groups.

11. The computer program product of claim 7, further configured to:
create an electronic group shopping cart that is accessible to the participants in the collaborative shopping event;
enable the participants in the collaborative event to choose delivering preferences of items included in the electronic group shopping cart;
calculate cost based on the items included in the electronic group shopping cart and the delivering preferences; and
enable participants to choose purchasing preferences for the items included in the electronic group shopping cart.

12. The computer program product of claim 11, wherein the delivering preferences includes only one location for delivery of the items included in the electronic group shopping cart and the purchasing preferences includes only one participant from the participants in the collaborative shopping event to pay for the items included in the electronic group shopping cart.

13. A system for dynamic group formation, the system comprising a multiple-processor server computing device, the server computing device including:
a first input data module configured to receive first information including: social networking service participant relationships of a plurality of participants, participant behavior data of the plurality of participants, classifications and similarities between products that the plurality of participants have purchased, and data from marketing activities;
a data mining module configured to receive the first information from the first input data module, and in response to receiving the first information, the data mining module is further configured to determine and create item recommendations to each participant of the plurality of participants;
a group discovery module configured to create a first set of one or more groups within the plurality of participants based on first information and the item recommendations to each participant;
a group adjustment module configured to adjust the first set of one or more groups to a second set of one or more groups based on at least whether one or more participants of the first set of one or more groups accept an invitation to join the first set of one or more groups; and
a recommendations-to-group module configured to make recommendations to the second set of one or more groups.

14. The system of claim 13, further comprising:
a participant invite module configured to allow inviting one or more individuals to the second set of one or more groups in order to join the second set of one or more groups;
a group discussion enablement module configured to enable group discussion within the second set of one or more groups regarding the recommendations to the second set of one or more groups;

a shared shopping cart creation module configured to create a shared shopping cart for the second set of one or more groups in response to a content of the group discussion, the shared shopping cart module being further configured to allow a first participant within second set of one or more groups to pay for an item or designate payment to a second participant.

15. The system of claim 14, further comprising:

a privacy protection module configured to allow the first participant to configure a level of privacy protection, wherein the privacy protection module is further configured to protect a set of information used by the group discovery module, wherein the privacy protection module is further configured to withhold an identity of the first participant from other participants of the second set of one or more groups;

a collaboration enablement module configured to take data obtained from the group discussion enablement module, the shared shopping cart creation module, and the privacy protection module and generate post-recommendation data, wherein the post-recommendation data is passed to the data mining module, and wherein the data mining module generates a third set of one or more groups based on the data received from the collaboration enablement module.

* * * * *